(12) United States Patent
Neumeier

(10) Patent No.: US 12,263,729 B2
(45) Date of Patent: Apr. 1, 2025

(54) ACTUATOR FOR A MOTOR VEHICLE

(71) Applicant: Bayerische Motoren Werke Aktiengesellschaft, Munich (DE)

(72) Inventor: Johannes Neumeier, Rottenburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 243 days.

(21) Appl. No.: 17/794,180

(22) PCT Filed: Dec. 7, 2020

(86) PCT No.: PCT/EP2020/084890
§ 371 (c)(1),
(2) Date: Jul. 20, 2022

(87) PCT Pub. No.: WO2021/148184
PCT Pub. Date: Jul. 29, 2021

(65) Prior Publication Data
US 2023/0056861 A1 Feb. 23, 2023

(30) Foreign Application Priority Data

Jan. 21, 2020 (DE) .................. 10 2020 101 249.7

(51) Int. Cl.
| | |
|---|---|
| *B60K 11/08* | (2006.01) |
| *B33Y 80/00* | (2015.01) |
| *F16K 31/06* | (2006.01) |

(52) U.S. Cl.
CPC ............ *B60K 11/085* (2013.01); *B33Y 80/00* (2014.12); *F16K 31/06* (2013.01)

(58) Field of Classification Search
CPC ....... B60K 11/085; B33Y 80/00; F16K 31/06; Y02T 10/88; F01P 7/10
See application file for complete search history.

(56) References Cited

U.S. PATENT DOCUMENTS 4,538,130 A * 8/1985 Gluckstern ........... H01F 7/0278
335/298
4,926,921 A * 5/1990 Heinemann ............. E06B 7/082
454/313
(Continued)

FOREIGN PATENT DOCUMENTS

| CN | 105091283 A | 11/2015 |
|---|---|---|
| DE | 30 19 599 A1 | 12/1980 |

(Continued)

OTHER PUBLICATIONS

German Search Report issued in German application No. 10 2020 101 249.7 dated Jan. 17, 2023, with Statement of Relevancy (Seven (7) pages).

(Continued)

Primary Examiner — Kurt Philip Liethen
(74) Attorney, Agent, or Firm — Crowell & Moring LLP

(57) ABSTRACT

An actuating apparatus for a motor vehicle includes an actuating element which is adjustable by loading with a magnetic field between a first position which provides a first vehicle function and a second position which provides a second vehicle function and a magnetic device where the actuating element can be loaded with the magnetic field by the magnetic device. The actuating element is an additively manufactured component.

4 Claims, 1 Drawing Sheet

(56) References Cited

U.S. PATENT DOCUMENTS

| | | | | |
|---|---|---|---|---|
| 7,866,737 | B2* | 1/2011 | Browne | F24F 13/15 |
| | | | | 49/82.1 |
| 7,911,115 | B2* | 3/2011 | Pelrine | A61M 60/196 |
| | | | | 310/330 |
| 9,224,528 | B2 | 12/2015 | Pohlmann et al. | |
| 9,987,919 | B2* | 6/2018 | Knauer | B60K 11/085 |
| 10,100,883 | B2 | 10/2018 | Martin et al. | |
| 10,214,095 | B2 | 2/2019 | Kornhaas | |
| 10,391,855 | B2* | 8/2019 | Brueckner | B60K 11/085 |
| 10,953,740 | B2* | 3/2021 | Solazzo | G01R 33/07 |
| 11,458,808 | B2* | 10/2022 | Kim | F24F 13/12 |
| 2003/0062660 | A1* | 4/2003 | Beard | H02K 15/02 |
| | | | | 264/645 |
| 2014/0199933 | A1 | 7/2014 | Wissmueller et al. | |
| 2017/0072784 | A1* | 3/2017 | Yoo | B60K 11/085 |
| 2018/0086199 | A1 | 3/2018 | Solazzo et al. | |
| 2020/0400110 | A1 | 12/2020 | Zhao et al. | |

FOREIGN PATENT DOCUMENTS

| | | |
|---|---|---|
| DE | 10 2009 047 525 A1 | 6/2011 |
| DE | 10 2010 000 969 A1 | 7/2011 |
| DE | 11 2015 004 085 B4 | 7/2017 |
| DE | 10 2016 218 391 A1 | 3/2018 |
| DE | 10 2017 000 401 A1 | 7/2018 |
| DE | 10 2017 009 508 A1 | 7/2018 |
| DE | 10 2018 109 640 A1 | 10/2019 |
| DE | 102019119210 A1 * | 1/2021 |
| EP | 0 308 601 A2 | 3/1989 |
| EP | 3 561 820 A3 | 10/2019 |
| FR | 3 067 098 A1 | 12/2018 |
| WO | WO 2019/053651 A1 | 3/2019 |
| WO | WO 2020/127871 A1 | 6/2020 |

OTHER PUBLICATIONS

PCT/EP2020/084890, International Search Report dated Mar. 5, 2021 (Three (3) pages).

Roh et al., "3D-Printed Silicone Soft Architectures with Programmed Magneto-Capillary Reconfiguration", Advanced Materials Technologies, 2019, $4^{th}$ Edition, (Six (6) pages).

English-language Chinese Office Action issued in Chinese Application No. 202080079075.7 dated Nov. 30, 2024 (5 pages).

* cited by examiner

ACTUATOR FOR A MOTOR VEHICLE

BACKGROUND AND SUMMARY OF THE INVENTION

The invention relates to an actuating apparatus for a motor vehicle.

US 2014/0199933 A1 has already disclosed a vehicle ventilation device which makes an outflow of air from an interior compartment of a vehicle possible. The vehicle ventilation apparatus is configured to compensate for a pressure in the interior compartment of the motor vehicle toward a surrounding area of the motor vehicle. The vehicle ventilation apparatus comprises a drive mechanism which is connected to a flap, in order to pivot the flap by means of the drive mechanism about a pivot axis. By means of the flap, the ventilation opening is closed or released depending on the pivoting position. The drive mechanism comprises a magnetic device which is configured to provide a magnetic field. Via the magnetic field, the flap can be pivoted about the pivot axis.

Furthermore, DE 10 2009 047 525 A1 has disclosed an electromagnetically actuable valve of a motor vehicle. The valve comprises a magnetic actuator.

Moreover, in "3D-Printed Silicone Soft Architectures with Programmed Magneto-Capillary Reconfiguration" in Advanced Materials Technologies 2019, 4th edition, S. Roh discloses soft intelligent structures, the shape of which can be set by way of the application of a magnetic field. These magneto-active soft structures are produced within the context of 3D printing.

It is an object of the present invention to provide an actuating apparatus for a motor vehicle, which actuating apparatus can be produced particularly simply and is particularly durable.

The invention relates to an actuating apparatus for a motor vehicle, with an actuating element which can be adjusted by way of loading with a magnetic field between a first position which provides a first vehicle function and a second position which provides a second vehicle function. In particular, the actuating element can be adjusted from the first position into the second position by way of loading with the magnetic field. In the case of the loading of the actuating element with the magnetic field, the actuating element can subsequently be held in the second position. In the case of removal of the magnetic field, the actuating element can be reset from the second position into the first position and can be held in the first position. In other words, the actuating element is held in the first position when no magnetic field prevails on the actuating element. As an alternative, in the case of loading with the magnetic field with a first field direction, the actuating element can be adjusted from the first position into the second position and can be held in the second position. In the case of loading with the magnetic field with a second field direction which is opposed to the first field direction, the actuating element can be reset from the second position into the first position and can be held in the first position.

Furthermore, the actuating apparatus comprises a magnetic device, by means of which the actuating element can be loaded with the magnetic field. The magnetic device is therefore configured to provide the magnetic field in the first field direction and/or the second field direction, and to prevent the provision of the magnetic field. The actuating element can therefore be controlled by means of the magnetic device. The magnetic device can therefore be used to set whether the first vehicle function or the second vehicle function is provided for the motor vehicle, by the magnetic field being provided in the first field direction or in the second field direction by means of the magnetic device or whether a provision of the magnetic field is stopped.

It is provided here according to the invention that the actuating element is manufactured additively. This means that the actuating element has been produced within the context of a generative manufacturing method. Additive manufacturing of the actuating element is to be understood to mean that the actuating element is instructed layer by layer. The additive manufacturing of the actuating element makes a particularly simple, inexpensive and rapid provision of the actuating element for the actuating apparatus possible. Moreover, the additive manufacturing of the actuating element makes particularly great flexibility in the design of the actuating element possible. Here, the actuating element is manufactured, in particular, from a material which is ferromagnetic, that is to say has ferromagnetic properties.

It is provided in one development of the invention that the actuating apparatus comprises an air guiding device for the motor vehicle, by means of which air guiding device air can be fed from a surrounding area of the motor vehicle to the motor vehicle. Furthermore, it is provided that a ventilation opening of the air guiding device is released by means of the actuating element in the first position for feeding air into the motor vehicle as first vehicle function, and the ventilation opening is closed by means of the actuating device in the second position for preventing the air feed into the motor vehicle as second vehicle function. The air guiding device is therefore configured to guide air, the actuating element extending over a cross section of the air guiding device at least in one of the positions and, as a result, covering the ventilation opening at least in regions. In particular, the actuating element covers the ventilation opening completely, a flow of air through the actuating element being released in the first position, and the throughflow of the actuating element by air being prevented in the second position. Therefore, the air guiding device can be locked particularly simply and reliably in its second position by means of the actuating element, in order to prevent a throughflow of the air guiding device with the air for the provision of the second vehicle function. An air feed into the motor vehicle can therefore be controlled particularly simply by means of the actuating element. In particular, the adjusting element is subject to particularly low wear during the adjustment by means of the magnetic field, as a result of which the actuating apparatus is particularly durable.

In this context, it has been shown to be particularly advantageous if an air feed via the ventilation opening to a radiator of the motor vehicle can be regulated by means of the air guiding device. Here, the actuating element can be configured as a ventilation louver of the air guiding device, by means of which ventilation louver an inflow of air into the air guiding device can be made possible or can be prevented. The first vehicle function is therefore cooling of the radiator of the motor vehicle by means of air which is guided by the air guiding device to the radiator. As second vehicle function, the radiator is not cooled. Therefore, temperature control of the radiator of the motor vehicle can be set particularly advantageously by means of the actuating apparatus. The actuating element of the actuating apparatus can advantageously be actuated particularly rapidly, with the result that respective opening or closing of the ventilation opening can be implemented particularly rapidly, as a result of which temperature control of the radiator of the motor vehicle can be regulated particularly rapidly and therefore with a particularly low inertia.

It has been shown to be advantageous in a further refinement of the invention if the actuating element is configured as a ventilation louver of the air guiding device, through which ventilation louver air can flow. This means that the actuating element is of louver-shaped configuration, clearances being kept free between respective louver struts in the first position of the actuating element, as a result of which air can flow through the actuating element, and the louver struts of the ventilation louver bearing against one another in the second position of the actuating element, with the result that the throughflow of air through the actuating element is at least substantially prevented. In the case of one refinement of the actuating element as ventilation louver, a particularly small positional shift of the respective louver struts is sufficient to release or to close the ventilation opening, as a result of which a switchover between the first vehicle function and the second vehicle function can be carried out particularly rapidly.

It has been shown to be advantageous in a further refinement of the invention if the magnetic device comprises a magnetic strip. This magnetic strip is, in particular, of switchable configuration, in order to provide a magnetic field in a first state and not to provide it in a second state. The magnetic strip is, in particular, of flexible configuration, as a result of which an orientation and a respective strength of the magnetic field can be set particularly simply and precisely in predefined positions of the actuating apparatus. Moreover, the magnetic strip makes particularly large regions of constant field strengths of the magnetic field possible, as a result of which the shape of the entire actuating element can advantageously be set in a targeted manner by means of the magnetic field.

In this context, it has proved to be particularly advantageous if the magnetic strip encloses the ventilation opening on the peripheral side. As a result, the actuating element can be adjusted particularly homogeneously between the first position and the second position by means of the magnetic strip if the actuating element covers the ventilation opening completely.

It is provided in a further refinement of the invention that the actuating element has a greater base area in the first position than in the second position. This means that, in the case of the adjustment of the actuating element between the first position and the second position, the actuating element changes its base area. For example, the actuating element is constructed during the adjustment from the first position into the second position and its base area is therefore compressed. During the adjustment of the actuating element from the second position into the first position, the actuating element can be stretched in its plane of extent, in order to increase the base area. The actuating element is therefore oriented in its first position parallel to its arrangement in its second position. A curvature of the actuating element out of the plane of extent therefore does not happen during the adjustment of the actuating element. In the case of the adjusting element, merely the base area therefore changes during its adjustment between the first position and the second position. An orientation of the actuating element relative to the air guiding device can therefore be kept at least substantially constant during an adjustment of the actuating element between the first position and the second position. As a result, particularly reliable releasing and closing of the ventilation opening of the air guiding device by means of the actuating element can be ensured.

Furthermore, it has been shown to be advantageous if a resetting device with a spring is provided, by means of which the actuating element can be reset via spring force from the second position into the first position. This means that, during the adjustment of the actuating element from the first position into the second position by way of loading of the actuating element with the magnetic field, this actuating element is adjusted and, by way of the adjustment of the actuating element, a spring stress is built up in the spring. If the magnetic field is removed, holding of the actuating element in the second position by means of the magnetic field stops, as a result of which the actuating element is reset from the second position into the first position by means of the spring with release of the spring stress. Therefore, the actuating element can be reset from the second position into the first position by means of the resetting device if no magnetic field is applied to the actuating element. The spring makes particularly simple, inexpensive and reliable resetting of the actuating element from the second position into the first position possible.

Further features of the invention result from the claims, the figures and the description of the figures. The features and combinations of features mentioned in the description above and the features and combinations of features mentioned in the description of the figures below and/or shown solely in the figures can be used not only in the respective specified combination, but rather also in other combinations or on their own.

The invention will now be described in greater detail on the basis of one preferred exemplary embodiment and with reference to the drawings.

DETAILED DESCRIPTION OF THE DRAWINGS

Figure 1:
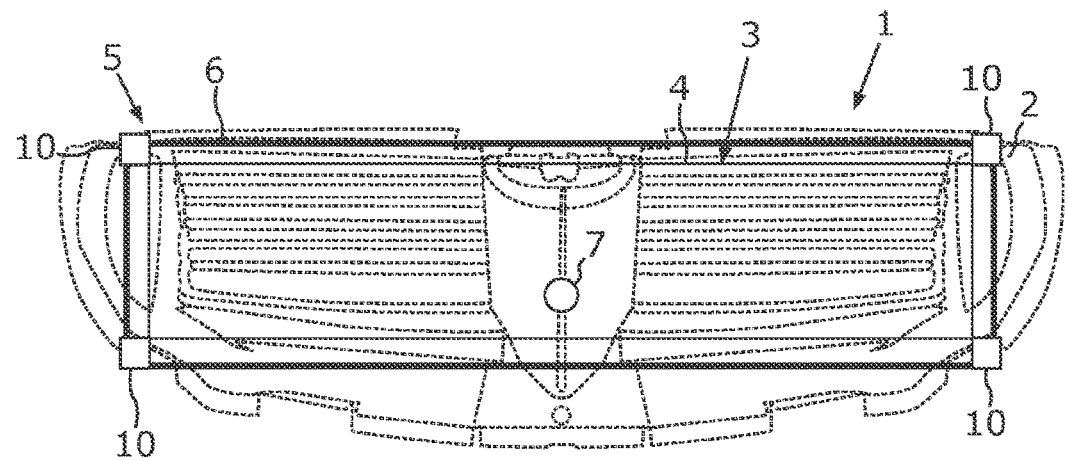
FIG. 1 shows a diagrammatic front view of an actuating apparatus for a motor vehicle, by means of which actuating apparatus an air feed into the motor vehicle can be set, and which actuating apparatus comprises an actuating element which can be adjusted from a first position into a second position by way of loading with a magnetic field, and can be reset from the second position into the first position with removal of the magnetic field.

FIG. 1 illustrates an actuating apparatus 1 for a motor vehicle. In the present case, the actuating apparatus 1 comprises an air guiding device 2, by means of which air can be guided from the surrounding area of the motor vehicle into the motor vehicle. In the present case, the motor vehicle is, in particular, a car, in particular a passenger car. In the present case, the air guiding device 2 has a ventilation opening 3, via which air from the surrounding area of the motor vehicle can flow into the air guiding device 2. By means of the air guiding device 2, the air which has flowed via the ventilation opening 3 into the air guiding device 2 can be guided to a radiator of the motor vehicle, in order to cool the radiator. In the present case, the ventilation opening 3 is covered by an actuating element 4 toward the outside in the flow direction of the air through the ventilation opening 3. In the present case, the actuating element 4 is manufactured additively and comprises a ferromagnetic material.

Figure 2A:
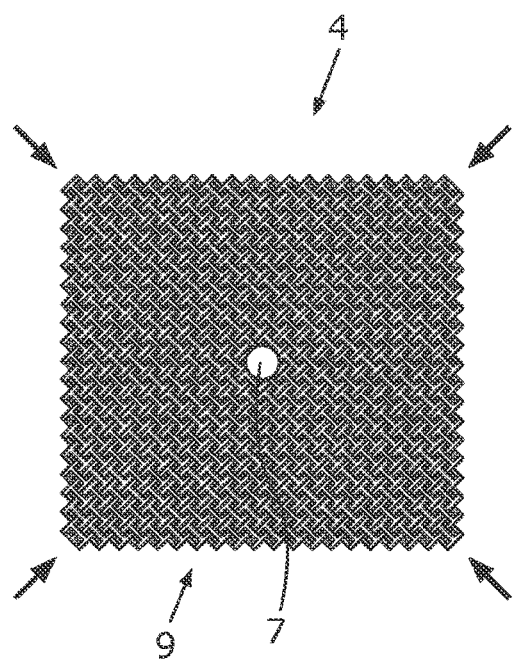
FIGS. 2a-2b show diagrammatic top views of the additively manufactured actuating element, the actuating element being shown in FIG. 2a in its second position which is loaded with the magnetic field and in FIG. 2b in its first position which is set in a manner which is free from the magnetic field.
Figure 2B:
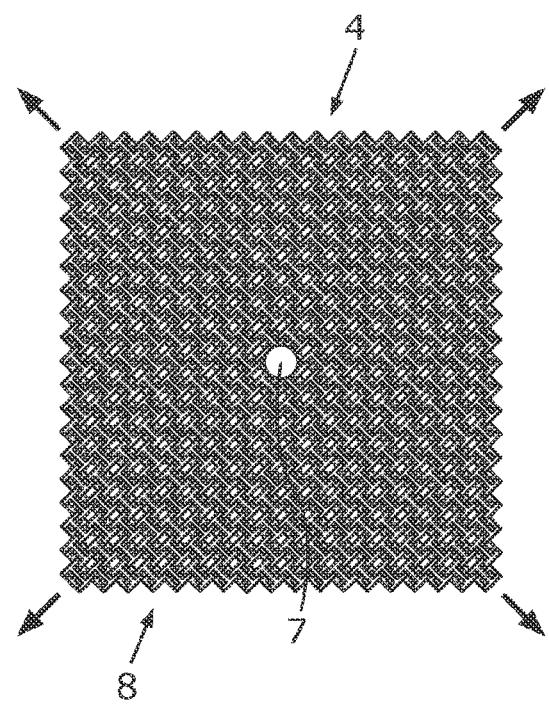

Furthermore, the actuating apparatus 1 comprises a magnetic device 5, by means of which a magnetic field can be provided. In the present case, the magnetic device 5 comprises a switchable magnetic strip 6 and a further switchable magnetic element 7. In particular, the magnetic element 7 and the magnetic strip 6 can be switched independently of one another or together. In the present case, the magnetic strip 6 encloses the ventilation opening 3 on the peripheral side. The magnetic element 7 is arranged within the ventilation opening 3. By means of the magnetic strip 6, the actuating element 4 can therefore be loaded with the magnetic field on the peripheral side, and the actuating element 4 can be loaded centrally with the magnetic field by means of the magnetic element 7. By means of a respective magnetic field which is provided by means of the magnetic device 5, the actuating element 4 can be adjusted between a first position 8 which is shown in FIG. 2b and a second position 9 which is shown in FIG. 2a. The actuating element 4 can be adjusted from the first position 8 into the second position 9 by way of loading with a magnetic field with a first field direction, and can be reset from the second position 9 into the first position 8 by way of loading the magnetic field with a second field direction which is opposed to the first field direction. As an alternative, the actuating element 4 can be adjusted from the first position 8 into the second position 9 by way of loading with the magnetic field in the first field direction, and can be reset from the second position 9 into the first position 8 by way of removal of the magnetic field. The magnetic element 7 and the magnetic strip 6 can be activated together, in order to provide a magnetic field with an identical field direction. As an alternative, the magnetic element 7 and the magnetic strip 6 can be activated in an alternating manner, the magnetic field of the one field direction being provided by means of the magnetic element 7 and the magnetic field with the other, opposed field direction being provided by means of the magnetic strip 6. In order to make particularly advantageous resetting from the second position 9 into the first position 8 possible, the actuating apparatus 1 can comprise a resetting device 10 which is labeled diagrammatically by way of a small box in FIG. 1. The resetting device 10 comprises at least one spring (in the present case, a plurality of springs), by means of which the actuating element 4 can be reset from the second position 9 into the first position 8 by a spring force. In the present case, the actuating element 4 can be pulled apart by means of the respective springs on outer edges or outer corners, in order to reset the actuating element 4 from the second position 9 into the first position 8.

The actuating element 4 is configured to release the ventilation opening 3 as first function if the actuating element 4 is arranged in the first position 8. If the actuating element 4 is arranged in the second position 9, the actuating element 4 closes the ventilation opening 3 as second vehicle function. In the first position 8 of the actuating element 4, the actuating element 4 therefore makes an inflow of air via the ventilation opening 3 into the air guiding device 2 possible. In the case of an arrangement of the actuating element 4 in the second position 9, the actuating element 4 prevents an inflow of air via the ventilation opening 3 into the air guiding device 2, and therefore closes the ventilation opening 3.

The actuating element 4 is shown in more detail in FIGS. 2a and 2b. In the present case, the actuating element 4 is configured as a ventilation louver which provides through openings for air in the first position 8, via which through openings air can flow through the ventilation opening 3, in order to flow into the air guiding device 2. The through openings are closed in the second position 9 of the actuating element 4, with the result that an inflow of air into the air guiding device 2 through the actuating element 4 is prevented. During the adjustment of the actuating element 4 between the first position 8 and the second position 9, a size of the base area of the actuating element 4 is changed. During the adjustment of the actuating element 4 between the first position 8 and the second position 9, the actuating element 4 is stretched or compressed within a plane of extent. During the adjustment of the actuating element 4 from the first position 8 into the second position 9, the actuating element 4 is compressed, whereas the actuating element 4 is stretched during the adjustment from the second position 9 into the first position 8. In the case of the stretching of the actuating element 4 during its adjustment from the second position 9 into the first position 8, the through openings of the actuating element 4 are released. In the present case, the actuating element 4 comprises a multiplicity of louver elements which are configured separately from one another and are interlinked with one another. The louver elements can be moved relative to one another within the plane of extent. Temperature control of an engine of the motor vehicle can be set via the setting of the air which flows to the radiator of the motor vehicle.

In one alternative embodiment which is not shown in the figures, the actuating element can be held on the air guiding device 2 such that it can be pivoted about a pivot axis. Here, the actuating element can be pivotable about the pivot axis between at least two positions, the actuating element releasing the ventilation opening 3 in one of the pivoting positions and closing the ventilation opening 3 in another pivoting position. Here, a size of the actuating element is identical in each of the pivoting positions. Here, the actuating element can be pivoted between the pivoting positions by way of loading with the magnetic field. Here, the actuating element can be covered by glass panes toward sides of the actuating element which lie opposite one another for a particularly high stability of the actuating element. Here, the actuating element can be of louver-shaped configuration for a particularly light embodiment of the actuating element.

The actuating element 4 can be actuated by means of the magnetic device 5 as a result of the production of the actuating element 4 as a ventilation louver and by means of an additive manufacturing method. An installation space of a front fairing of the motor vehicle can be of particularly small configuration on account of the actuation of the actuating element 4 by means of the magnetic device 5, in particular by means of the magnetic strip 6 and/or the magnetic element 7, it being possible for the actuating element 4 to be adjusted particularly efficiently by means of the magnetic device 5. As a result of magnetic actuation of the actuating element 4, a wear-susceptible actuating motor and associated mechanism can be dispensed with. The actuating apparatus 1 is of particularly low-weight configuration on account of the magnetic device 5. An actuation of the actuating element 4 by means of magnetism is implemented more rapidly than an adjustment of air guiding flaps, by means of which the ventilation opening 3 can be released and closed, by means of an actuating motor.

The additive manufacturing of the actuating element 4 has the advantage that, in the case of additive manufacturing of the actuating element 4, movements and/or functions of the actuating element 4 can be provided, and a particularly high design freedom in the case of construction or design can be utilized. As a result, the actuating element 4 can be manufactured in such a way that the actuating element 4 experiences a three-dimensional deformation and/or is moved three-dimensionally in space during its adjustment between the respective positions 8, 9. Furthermore, the actuation of the actuating element 4 by means of the magnetic device 5 makes it possible that the ventilation opening 3 can be released and closed without mechanical movement of the actuating element 4, as a result of which continuous loading of the actuating apparatus 1 is particularly high. The actuating element 4 can be used in order to release and close the ventilation opening 3, via which air can be conducted to the radiator of the motor vehicle. As an alternative or in addition, the actuating apparatus 1 can be configured to feed air to an interior compartment of the motor vehicle, it being possible for the ventilation opening 3 for guiding air into the interior compartment of the motor vehicle to be released and suppressed by means of the actuating element 4.

Overall, the invention shows how magnetic functional components which are produced by means of additive manufacturing can be utilized.

LIST OF REFERENCE CHARACTERS

1 Actuating apparatus
2 Air guiding device
3 Ventilation opening
4 Actuating element
5 Magnetic device
6 Magnetic strip
7 Magnetic element
8 First position
9 Second position
10 Resetting device

The invention claimed is:

1. An actuating apparatus of a motor vehicle, comprising:
an actuating element which is adjustable by loading with a magnetic field between a first position which provides a first vehicle function and a second position which provides a second vehicle function;
a magnetic device, wherein the actuating element can be loaded with the magnetic field by the magnetic device;
wherein the actuating element is an additively manufactured component and wherein the actuating element comprises a multiplicity of louver elements which are configured separately from one another and are interlinked with one another and are moveable relative to one another within a plane of extent; and
an air guiding device, wherein air is feedable from a surrounding area of the motor vehicle to the motor vehicle by the air guiding device, wherein a ventilation opening of the air guiding device is released by the actuating element in the first position and wherein feeding air into the motor vehicle is the first vehicle function, and wherein the ventilation opening of the air guiding device is closed by the actuating device in the second position and wherein preventing air feed into the motor vehicle is the second vehicle function;
wherein during an adjustment of the actuating element from the first position into the second position the actuating element is compressed in the plane of extent such that a base area of the actuating element is reduced, wherein during an adjustment of the actuating element from the second position into the first position the actuating element is stretched in the plane of extent such that the base area is increased, wherein the first position of the actuating element is parallel to the second position of the actuating element, wherein a curvature of the actuating element out of the plane of extent does not occur during the adjustment of the actuating element, wherein only a size of the base area changes during the adjustment between the first position and the second position, and wherein an orientation of the actuating element relative to the air guiding device is kept constant during the adjustment of the actuating element between the first position and the second position.

2. The actuating apparatus according to claim 1, wherein a feed of air via the ventilation opening to a radiator of the motor vehicle is regulatable by the air guiding device.

3. The actuating apparatus according to claim 1, wherein the magnetic device is a magnetic strip and wherein the magnetic strip encloses the ventilation opening on a peripheral side.

4. The actuating apparatus according to claim 1, further comprising a resetting device with a spring, wherein the actuating element is resettable via a spring force of the spring from the second position into the first position.

\* \* \* \* \*